(12) United States Patent
Xu et al.

(10) Patent No.: US 12,137,836 B2
(45) Date of Patent: Nov. 12, 2024

(54) MILK WARMER

(71) Applicant: SHENZHEN JINGDU TECHNOLOGY CO., LTD., Shenzhen (CN)

(72) Inventors: Shaoyuan Xu, Shenzhen (CN); Tiejun Li, Shenzhen (CN); Huchun Xiao, Shenzhen (CN)

(73) Assignee: SHENZHEN JINGDU TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/323,611

(22) Filed: May 25, 2023

(65) Prior Publication Data

US 2024/0049908 A1 Feb. 15, 2024

Related U.S. Application Data

(63) Continuation of application No. PCT/CN2023/087704, filed on Apr. 12, 2023.

(30) Foreign Application Priority Data

Aug. 15, 2022 (CN) .......................... 202222148077.6

(51) Int. Cl.
*A47J 36/24* (2006.01)
(52) U.S. Cl.
CPC ..................................... *A47J 36/24* (2013.01)
(58) Field of Classification Search
CPC .... A47J 36/24; A47J 36/2411; A47J 36/2433; A47J 36/2444; A47J 36/2461; A47J 27/21058; A47J 27/21066; A47J 27/21158
(Continued)

(56) References Cited

U.S. PATENT DOCUMENTS 10,391,461 B2 * 8/2019 Alfoudari ............. B01F 27/808
10,729,620 B2 * 8/2020 Goodin ................. A47J 43/046
(Continued)

FOREIGN PATENT DOCUMENTS

CN  109498461  * 3/2019
CN  110339068  * 10/2019
(Continued)

OTHER PUBLICATIONS

CN213640519 (Year: 2023).*
(Continued)

*Primary Examiner* — Nathaniel E Wiehe
*Assistant Examiner* — Frederick F Calvetti
(74) *Attorney, Agent, or Firm* — Daniel M. Cohn; Howard M. Cohn (57) ABSTRACT

The present application discloses a milk warmer, which includes: a milk warmer base, the milk warmer base is provided with a first accommodation space, and the first accommodation space is used to accommodate milk to be heated; a heating member for heating the first accommodation space; a temperature measuring member for detecting the temperature of the heating member; a first fixing bracket used to fix the position of the temperature measuring member; wherein the heating member is provided with a connection hole, one end of the temperature measuring member is connected in the connection hole, and the other end of the temperature measuring member is connected with the first fixing bracket. The milk warmer of this disclosure can increase the volume of the heating member while maintaining an original volume of the milk warmer, and the heating speed can be increased accordingly.

2 Claims, 9 Drawing Sheets (58) Field of Classification Search
USPC .......................................................... 99/483
See application file for complete search history.

(56) References Cited

U.S. PATENT DOCUMENTS

| | | | | |
|---|---|---|---|---|
| 10,863,851 | B1* | 12/2020 | Ganahl | A47J 27/21175 |
| 11,896,164 | B2* | 2/2024 | Bass | B01F 33/5011 |
| 2011/0024537 | A1* | 2/2011 | Gonzalez | A47J 43/046 |
| | | | | 215/11.1 |
| 2012/0217236 | A1* | 8/2012 | Takagi | A47J 43/085 |
| | | | | 219/647 |
| 2015/0165402 | A1* | 6/2015 | King | B01F 35/32025 |
| | | | | 366/145 |
| 2016/0354740 | A1* | 12/2016 | Gonzalez | B01F 21/10 |
| 2018/0249863 | A1* | 9/2018 | Moksin | F24C 7/10 |
| 2019/0021548 | A1* | 1/2019 | Eisner, IIII | A47J 36/2433 |
| 2019/0269578 | A1* | 9/2019 | Goodin | A47J 36/2433 |
| 2021/0235931 | A1* | 8/2021 | Souris | A47J 41/0094 |
| 2022/0250020 | A1* | 8/2022 | Lupo | B01F 35/32025 |
| 2023/0213392 | A1* | 7/2023 | Wang | G01K 13/20 |
| | | | | 374/175 |
| 2023/0225550 | A1* | 7/2023 | Johnson | A47J 36/2411 |
| | | | | 165/80.5 |
| 2023/0240475 | A1* | 8/2023 | Orofino | A47J 41/0038 |
| | | | | 220/592.17 |

FOREIGN PATENT DOCUMENTS

| | | | |
|---|---|---|---|
| DE | 1019694 | * | 10/2012 |
| KR | 200438457 | * | 2/2008 |
| WO | WO2006001745 | * | 1/2006 |
| WO | WO2010023312 | * | 3/2010 |
| WO | WO2014009339 | * | 1/2014 |
| WO | WO2015019988 | * | 12/2015 |
| WO | WO2021022329 | * | 2/2021 |

OTHER PUBLICATIONS

CN108851878 (Year: 2023).*
CN205107350 (Year: 2023).*
CN203619395 (Year: 2023).*
KR102351746 (Year: 2023).*
CN113647831 (Year: 2023).*
CN211299570 (Year: 2023).*
CN1135598621 (Year: 2023).*
CN101332046 (Year: 2023).*
CN212995892 (Year: 2023).*
CN113384151 (Year: 2023).*
WO2014172888 (Year: 2023).*
CN210540557 (Year: 2023).*
CN108420267 (Year: 2023).*
WO2010023312 (Year: 2024).*
BE1019694 (Year: 2024).*
WO2021022329 (Year: 2024).*
WO2014009339 (Year: 2024).*

* cited by examiner

MILK WARMER

CROSS-REFERENCE TO RELATED APPLICATIONS

This application is a continuation of International Application No. PCT/CN2023/087704, filed on Apr. 12, 2023, which claims the priority of Chinese Patent Application No. 202222148077.6, filed on Aug. 15, 2022, which are hereby incorporated by reference in their entireties.

TECHNICAL FIELD

The present application relates to the technical field of milk warmers. More specifically, the present disclosure relates to a milk warmer.

BACKGROUND

Milk warmers are mainly used for heating and/or keeping warm of the prepared milk or infant formula. Traditional milk warmers, such as a new type of portable milk warmer disclosed in the C.N. Pat. No. 201822002162.5, includes a heating member, a temperature sensor and a supporting frame for supporting the temperature sensor. The temperature sensor is partially embedded in the supporting frame, and the combination of the temperature sensor and the supporting frame is further embedded in the heating body. Therefore, the heating member needs to be provided with accommodation spaces, such as holes and grooves corresponding to the embedded parts of the temperature sensor and the supporting frame, thereby greatly limiting the volume of the heating member. Due to the small volume of the heating member, the heating speed of the milk warmer may be greatly reduced.

SUMMARY

One purpose of the present application is to solve the above problems and provide corresponding beneficial effects.

Another object of the present application is to provide a milk warmer, which solves the technical problem of how to increase the volume of the heating member and increase the heating speed while maintaining the original volume of the traditional milk warmer. The present application is mainly realized through the following embodiments:

The present application provides a milk warmer, which includes:
- a milk warmer base, the milk warmer base is provided with a first accommodation space, and the first accommodation space is used to accommodate milk to be heated;
- a heating member for heating the first accommodation space;
- a temperature measuring member for detecting the temperature of the heating member;
- a first fixing bracket used to fix the position of the temperature measuring member;
- wherein the heating member is provided with a connection hole, one end of the temperature measuring member is connected in the connection hole, and the other end of the temperature measuring member is connected with the first fixing bracket.

In some embodiments, the heating member is disposed at the bottom of the milk warmer.

In some embodiments, the connection hole is a through-hole, and one end of the temperature measuring member passes through the connection hole to connect or contact with the bottom of the milk warmer base.

In some embodiments, the first fixing bracket includes a first position restraining slot, and the other end of the temperature measuring member is accommodated in the first position restraining slot.

In some embodiments, the first fixing bracket is screwed to the milk warmer base.

In some embodiments, the milk warmer further includes a stirring member, a motor, a rotating member and at least one first magnetic member, wherein the stirring member is accommodated in the middle of the first accommodation space, and the stirring member is magnetically connected to the rotating member through the first magnetic member, and the motor is connected to the rotating member.

In some embodiments, the milk warmer further includes a second fixing bracket, the second fixing bracket is connected to the first fixing bracket, and a connecting portion of the heating member is connected to the second fixing bracket; and the first fixing bracket is further connected with the rotating member and the motor.

In some embodiments, the milk warmer further includes a sealing member, a display device, a control circuit board, a battery pack, a touch sensing device, a casing, a charging interface, a waterproof member and an anti-skid member, wherein the display device, the battery pack, the touch sensing device, the charging interface, the motor, the temperature measuring member and the heating member are electrically connected to the control circuit board, and the sealing member is accommodated inside the milk warmer base, the anti-skid member, the waterproof member and the first fixing bracket are respectively connected to the casing.

In some embodiments, the heating member is disposed on an upper surface of the second fixing bracket.

In some embodiments, the milk warmer further includes a feeding bottle or a powder storage bottle, wherein the milk warmer base is screwed to the feeding bottle or the powder storage bottle.

In some embodiments, the control circuit board is configured to send a heating signal to the heating member, send a driving signal to the motor, receive temperature information sent by the temperature measuring member, and/or send a temperature displaying signal to the display device.

In some embodiments, an MCU (Microcontroller Unit) is integrated on the control circuit board, the MCU is configured for controlling and managing of overall circuit of the milk warmer, including battery charge and discharge managing.

In some embodiments, the milk warmer further includes an elastic member, the elastic member is disposed in the first position restraining slot, and the temperature measuring member passes through the center of the elastic member and electrically connects with the control circuit board.

The beneficial effects of the present disclosure may include:
1) In the present application, one end of the temperature measuring member is connected to the connection hole of the heating member, and the other end of the temperature measuring member is connected to the first fixing bracket, so that a supporting frame such as the first fixing bracket which supports the temperature measuring member, does not need to be arranged in any part of the heating member. In other words, the heating member of the present application only needs to provide an accommodation space corresponding to the temperature measuring member, and does not need to provide an accommodation space corresponding to the supporting member. Compared with the design of providing an accommodation space corresponding to both the temperature measuring member and the supporting frame in the prior art, the embodiments of the present application have a larger space reserved for the heating member while maintaining the original volume of the traditional milk warmer. Thus, the volume of the heating member can be effectively increased, and the heating speed can be increased accordingly.

2) The milk warmer of the present application also includes a control circuit board, a temperature measuring member and a display device, which makes the temperature control of the milk warmer more precise.

3) The milk warmer provided by the present application is small in size, which is convenient for the user to carry with when going out.

4) The milk warmer of the present application, which includes the stirring member, the motor, the rotating member and the first magnetic member, can stir the milk through the stirring member during the heating process, to increase the heating speed.

Unless otherwise defined, all technical and scientific terms used herein have the same meaning as commonly understood by a person having ordinary skill in the art to which the present disclosure belongs.

The various features and embodiments of the present disclosure mentioned in the above-mentioned aspects may be applied to other aspects under the condition of proper modification as the case may be. Therefore, specific features in one aspect may be combined with specific features in other aspects as appropriate.

Other advantages, objectives and features of the present disclosure will partly be described through the following descriptions, and parts of these will be understood by those skilled in the art through the research and practice of the present disclosure.

BRIEF DESCRIPTION OF DRAWINGS

In order to more clearly illustrate the technical solutions of embodiments of the present disclosure, the following will briefly introduce the accompanying drawings that need to be used in the description of the embodiments of the present application. Obviously, the accompanying drawings in the following description are only some embodiments of the present application, for those skilled in the art, other drawings can also be obtained according to these drawings without any creative effort.

DESCRIPTION OF REFERENCE NUMBERS IN THE DRAWINGS 1. milk warmer;
10. milk warmer base; 11. seventh position restraining slot; 12. protruding portion;
20. first fixing bracket; 21. first position restraining slot; 22. fourth position restraining slots; 23. fifth position restraining slot; 24. sixth position restraining slot; 25. through-holes;
30. heating member; 31. connection hole; 32. connecting portion;
40. temperature measuring member;
50. display device;
60. control circuit board;
70. stirring member; 71a, first stirring portion; 71b, second stirring portion; 72, second magnetic member;
80, motor; 81, rotating shaft;
90, rotating member; 91, channel;
100. first magnetic member;
101, second fixing bracket; 1011, second position restraining slot; 1012, third position restraining slot; 1013, first limiting column; 1014, second limiting column;
102. sealing member;
103. battery pack;
104. charging interface;
105. waterproof members;
106. touch sensing device;
107, casing; 1071, connection port; 1072, eighth position restraining slot;
108. anti-skid members;
109. elastic member;
A. first accommodation space;
B. second accommodation spaces;
C. third accommodation spaces.

DETAILED DESCRIPTIONS

In order to make the purposes, embodiments and advantages of the present disclosure clearer, the technical solutions in the embodiments of the present disclosure will be clearly and completely described below in conjunction with the accompanying drawings. Obviously, the described embodiments are parts of possible embodiments of the present disclosure, not all of them. Based on the described embodiments in the present disclosure, all other embodiments obtained by persons having ordinary skill in the art without creative efforts fall within the scope of the present disclosure.

The terms "first", "second", and "third" in the description of the embodiments of the present disclosure are used to distinguish different objects, rather than to describe a specific sequence of the objects. For example, the first position restraining slot, the second position restraining slot and the third position restraining slot are used to distinguish different position restraining slots, rather than describe a specific order of the position restraining slots. The orientation or positional relationship indicated by the terms "inner", "middle", "bottom", "upper", etc. are based on the orientation or positional relationship shown in the drawings, and are only for the convenience of describing the present disclosure and simplifying the description, rather than indicating or implying that a referenced device or member must have a particular orientation, be constructed and operated in a particular orientation, thus should not be construed as limiting the scope of the present disclosure.

In the embodiments of the present disclosure, words such as "exemplary" or "for example" are used as examples, illustrations or samples. Any embodiment or design scheme described as "exemplary" or "for example" in the embodiments of the present disclosure shall not be interpreted as being more preferred or more advantageous than other embodiments or design schemes. Rather, the use of words such as "exemplary" or "such as" is intended to present related concepts in a concrete manner.

It should be noted that, in this document, the term "comprising", "including" or any other variation thereof is intended to cover a non-exclusive inclusion, for example, a process, a method, a system, a product or a apparatus including a series of steps or units is not necessarily limited to only having those steps or units explicitly listed, but may further include other steps or units not explicitly listed or inherent to the process, the method, the product or the apparatus.

The specific embodiments of the present disclosure is further described below in conjunction with the accompanying drawings.

Figure 6:
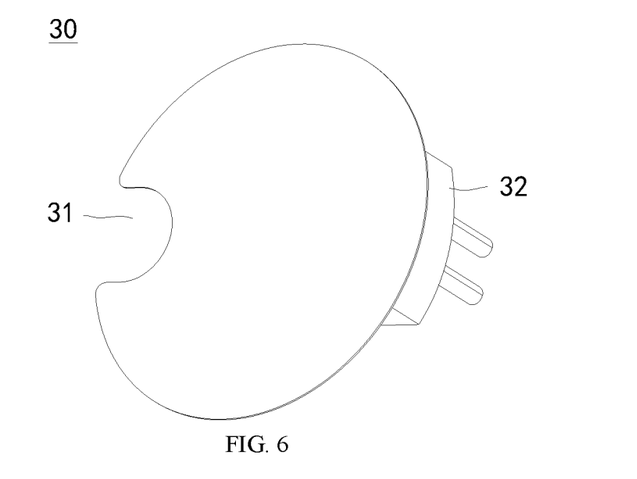
FIG. 6 is a structural schematic diagram of a heating member according to some embodiments of the present disclosure.

As shown in FIGS. 1-4, an embodiment of the present disclosure provides a milk warmer 1, including:

a milk warmer base 10, the milk warmer base 10 is provided with a first accommodation space A, and the first accommodation space A is used to accommodate milk which needs to be heated;

a heating member 30 configured to heat the first accommodation space A;

a temperature measuring member 40 configured to detect the temperature of the heating member 30;

a first fixing bracket 20 used to fix the position of the temperature measuring member 40; wherein, the heating member 30 is provided with a connection hole 31, as shown in FIG. 6, one end of the temperature measuring member 40 is connected in the connection hole 31, that is, one end of the temperature measuring member 40 is connected to the heating member 30 through the connection hole 31, and the other end of the temperature measuring member 40 is connected with the first fixing bracket 20.

It should be noted that the milk warmer base 10 includes a plurality of welding parts, each of the welding parts is provided with a screw hole. The milk warmer base 10 is a stainless-steel milk warmer base.

The side wall of the first accommodation space A is provided with a screw structure for connecting a feeding bottle.

The heating member 30 may be a ceramic heating member, specifically, it may be an MCH (Metal Ceramics Heater) ceramic heating member. The heating member 30 is not limited to the foregoing examples, and can be set by those skilled in the art according to actual needs.

The temperature measuring member 40 is a temperature sensor.

In some embodiments, the heating member 30 is disposed at the bottom of the milk warmer base 10. More specifically, the heating member 30 is entirely disposed at the bottom of the milk warmer base 10.

In some embodiments, the connection hole 31 is a through-hole, and one end of the temperature measuring member 40 passes through the connection hole 31 to connect or contact with the bottom of the milk warmer base 10.

The connection hole 31 is disposed on one side of the heating member 30.

In some embodiments, the first fixing bracket 20 includes a first position restraining slot 21, and the other end of the temperature measuring member 40 is accommodated in the first position restraining slot 21. The first fixing bracket 20 is screwed to the milk warmer base 10.

Figure 1:
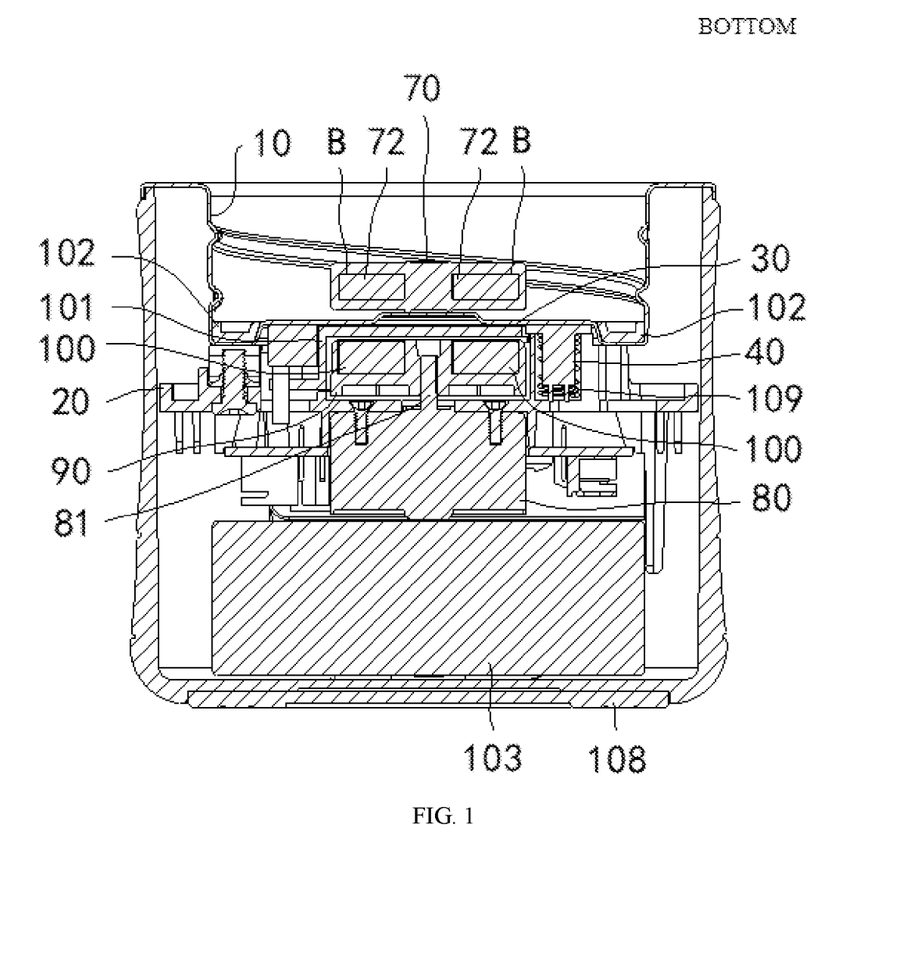
FIG. 1 is a schematic cross-sectional view of a milk warmer according to some embodiments of the present disclosure.
Figure 2:
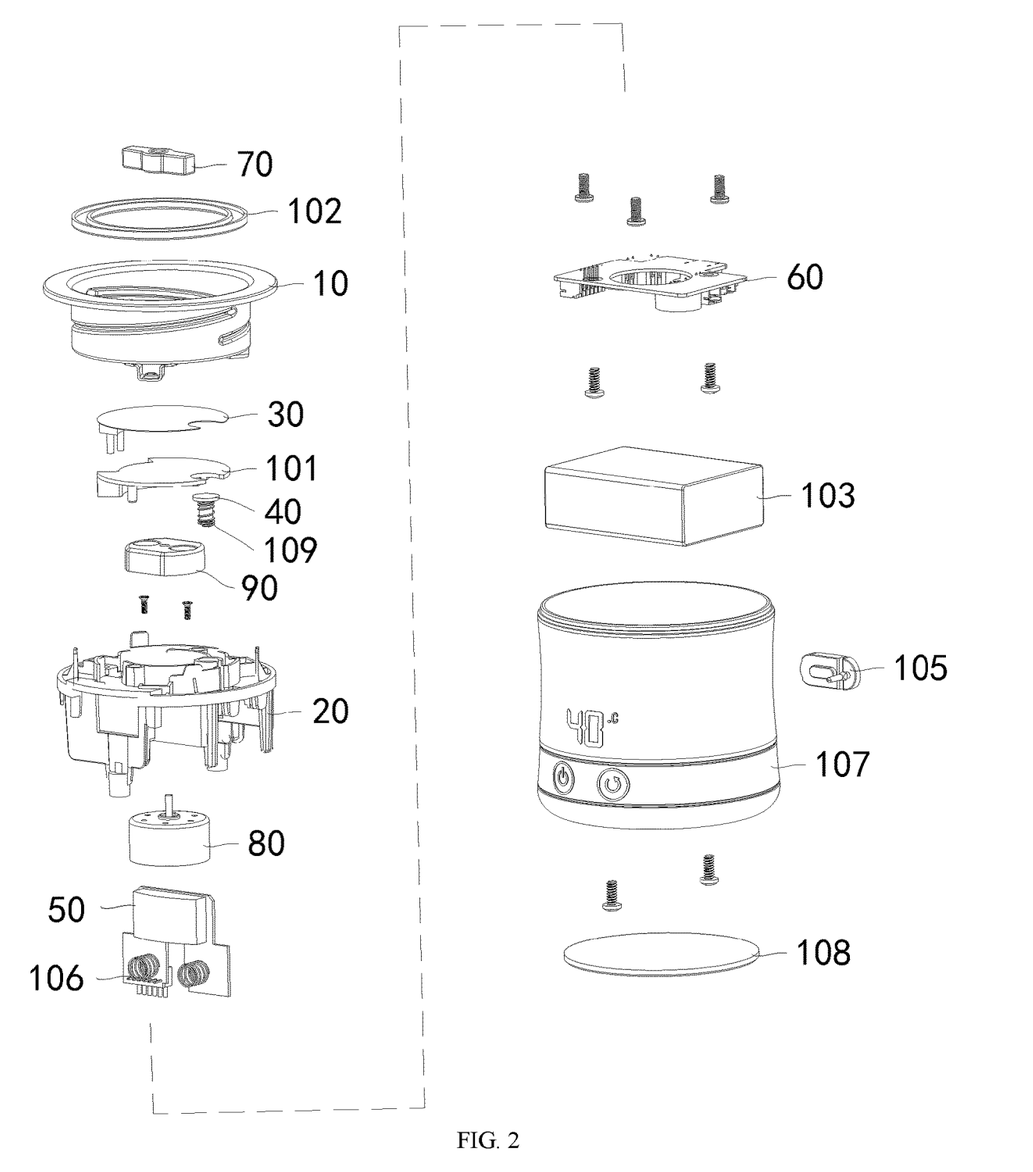
FIG. 2 is a schematic exploded diagram of the milk warmer according to some embodiments of the present disclosure.
Figure 7:
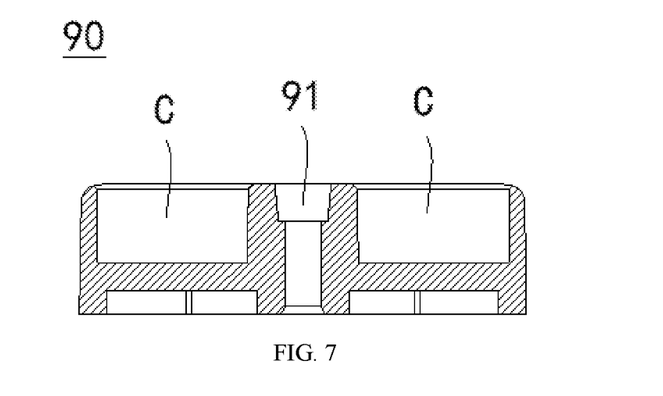
FIG. 7 is a schematic cross-sectional view of a rotating member according to some embodiments of the present disclosure.

In some embodiments, as shown in FIGS. 1-2 and 7, the milk warmer 1 further includes a stirring member 70, a motor 80, a rotating member 90 and at least one first magnetic member 100, wherein the stirring member 70 is accommodated in the middle of the first accommodation space A, the stirring member 70 is magnetically connected to the rotating member 90 through the first magnetic member 100, and the motor 80 is connected to the rotating member 90.

Specifically, the stirring member 70 is connected to the bottom of the milk warmer base 10. The stirring member 70 includes at least one stirring portion, each of the stirring portion includes a second accommodation space B, and the second accommodation space B accommodates a corresponding second magnetic member 72.

Figure 3:
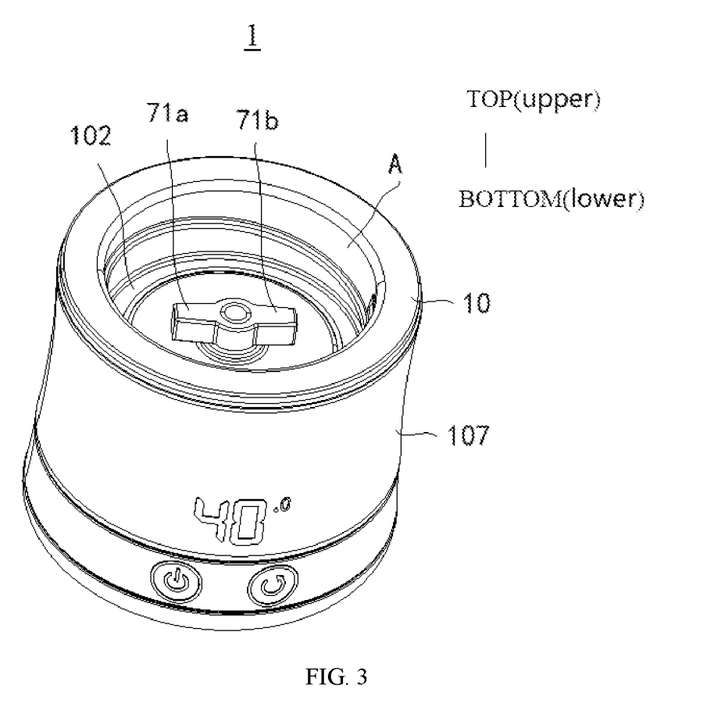
FIG. 3 is a structural schematic diagram of the milk warmer according to some embodiments of the present disclosure.

The at least one stirring portion includes a first stirring portion 71a and a second stirring portion 71b, as shown in FIG. 3. The first stirring portion 71a and the second stirring portion 71b are disposed opposite to each other. In other embodiments, the number of the at least one stirring portion is not limited to two, and may be more than three or four, which is not further limited herein.

The shape of the second accommodation space B may be cylindrical, and the second accommodation space B is disposed inside the stirring portions.

The stirring member 70 can be a stirring rotor.

The rotating member 90 includes a channel 91 and at least one third accommodation space C, a rotating shaft 81 of the motor 80 is connected to the rotating member 90 through the channel 91, each of the third accommodation spaces C is used for accommodating the corresponding first magnetic member 100, and the first magnetic member 100 is magnetically connected to the corresponding second magnetic member 72. The rotating shaft 81 is configured to rotate to drive the rotating member 90 to rotate, so the second magnetic member 72 is magnetically attracted by the first magnetic member 100 to drive the stirring member 70 to rotate and stir the milk. The rotating member 90 is a driving rotor.

The first magnetic member 100 and the second magnetic member 72 are magnets. The shape of the second magnetic member 72 is identical to the second accommodation space B.

The number of the first magnetic members 100 is the same as the number of the stirring portions, that is, in some embodiments, the number of the first magnetic members 100 is two. The shape of the first magnetic member 100 can be cylindrical. In other embodiments, the shape of the first magnetic member 100 may be a cube or an ellipsoid, which can be configured by those skilled in the art according to requirements.

The number of the at least one third accommodation space C is the same as the number of the first magnetic member 100. The shape of the third accommodation space C is adapted to the shape of the first magnetic member 100. All the first magnetic components 100 are accommodated in the corresponding third accommodation space C, respectively.

In some embodiments, as shown in FIG. 1, the milk warmer 1 further includes a second fixing bracket 101, the second fixing bracket 101 is connected to the first fixing bracket 20, and a connecting portion 32 of the heating member 30 is connected with the second fixing bracket 101. The first fixing bracket 20 is further connected with the rotating member 90 and the motor 80.

Figure 8:
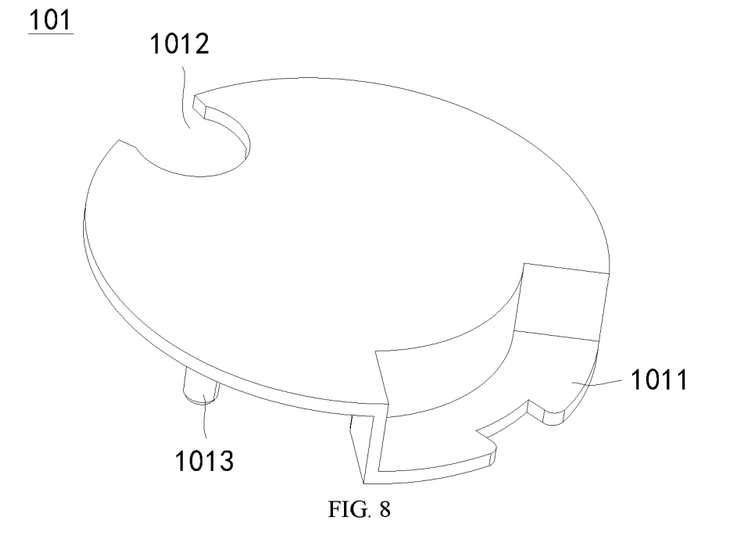
FIG. 8 is a schematic structural view of a second fixing bracket according to some embodiments of the present disclosure.
Figure 9:
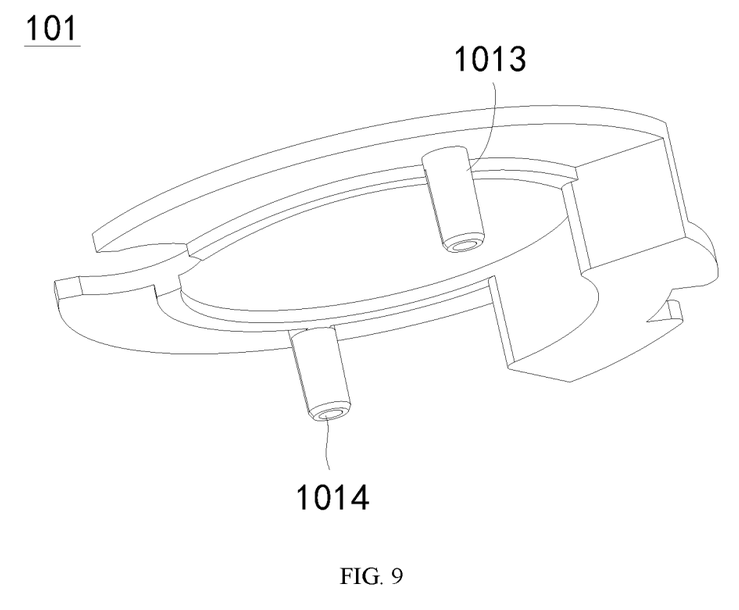
FIG. 9 is a schematic structural view of the second fixing bracket according to some other embodiments of the present disclosure.

The second fixing bracket 101 includes a second position restraining slot 1011, a third position restraining slot 1012 and at least one limiting column, as shown in FIGS. 8 and 9. The first fixing bracket 20 further includes at least one fourth position restraining slot 22, a fifth position restraining slot 23, a sixth position restraining slot 24 and a through-hole 25, as shown in FIG. 10, each of the limiting columns is accommodated in a corresponding one of the fourth position restraining slots 22, The connecting portion 32 of the heating member 30 is accommodated in the second position restraining slot 1011, and one end of the temperature measuring member 40 passes through the third position restraining slot 1012 and is accommodated in the connection hole 31.

The at least one limiting column includes a first limiting column 1013 and a second limiting column 1014.

The number of the at least one fourth position restraining slots 22 is the same as the number of the limiting columns, and the shape of the fourth position restraining slots 22 is adapted to the shape of the limiting columns.

Figure 10:
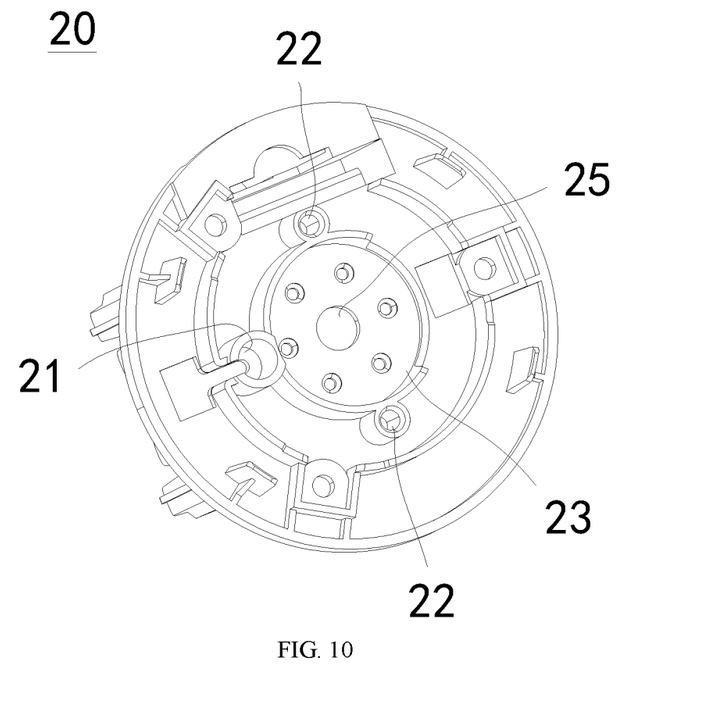
FIG. 10 is a schematic structural view of a first fixing bracket according to some embodiments of the present disclosure.
Figure 11:
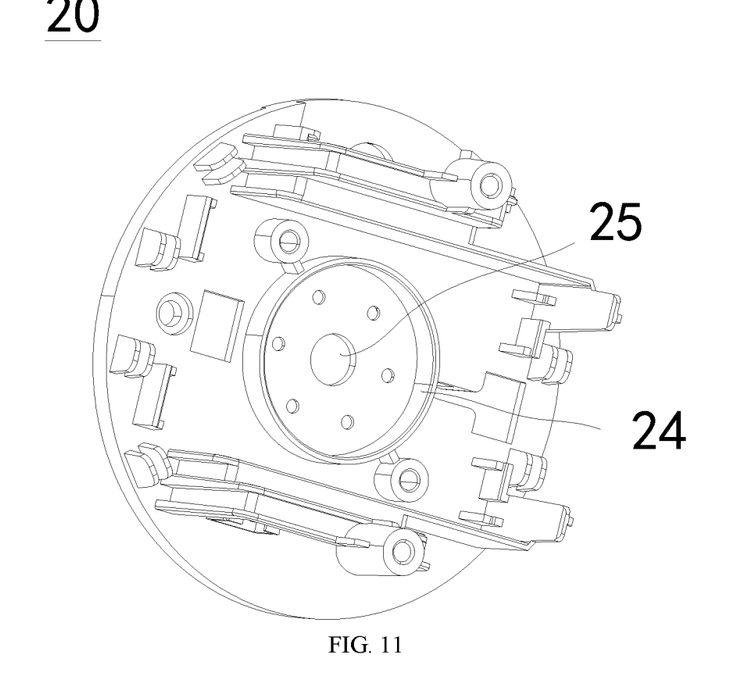
FIG. 11 is a schematic structural view of the first fixing bracket according to some other embodiments of the present disclosure.

As shown in FIGS. 10 and 11, the fifth position restraining slot 23 is used to accommodate the rotating member 90, the sixth position restraining slot 24 is used to accommodate the motor 80, and the rotating shaft 81 passes through the through-hole 25 and is connected with the rotating member 90.

In some embodiments, as shown in FIG. 1, the milk warmer 1 further includes a sealing member 102, a display device 50, a control circuit board 60, and a battery pack 103. The sealing member 102 is disposed in the milk warmer base 10. The display device 50 and the battery pack 103 are respectively electrically connected to the control circuit board 60.

The milk warmer base 10 further includes a seventh position restraining slot 11, and the sealing member 102 is accommodated in the seventh position restraining slot 11. The seventh position restraining slot 11 is arranged in a ring shape, and the shape of the sealing member 102 is adapted to the shape of the seventh position restraining slot 11.

The sealing member 102 is configured as a V-shaped sealing gasket for preventing the milk in the feeding bottle from leaking. In other embodiments, the sealing member 102 can also be set in a U-shape, an O-shape or other shapes, which can be set by those skilled in the art according to actual needs.

The display device 50 may be an LED liquid crystal display, an OLED screen or a Seven-Segment LED display.

The battery pack 103 is a lithium battery pack 103 for providing power to the control circuit board 60. The battery pack 103 is disposed at the bottom of the milk warmer 1.

The control circuit board 60 is also electrically connected to the motor 80.

Figure 4:
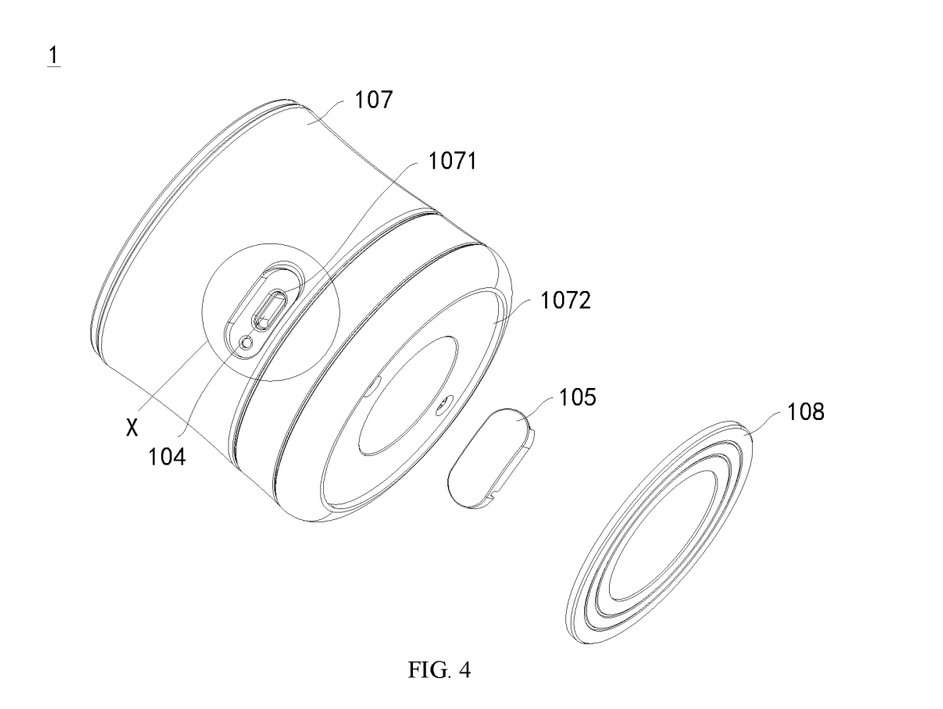
FIG. 4 is an exploded schematic view of the milk warmer according to some embodiments of the present disclosure.

In some embodiments, as shown in FIG. 4, the milk warmer 1 further includes a charging interface 104 and a waterproof member 105. The charging interface 104 is electrically connected to the control circuit board 60, and the waterproof member 105 is detachably connected to the charging interface 104.

The waterproof member 105 is connected to the first fixing bracket 20. The waterproof member 105 is a waterproof cover.

In some embodiments, as shown in FIG. 2, the milk warmer 1 further includes a touch sensing device 106 and a casing 107, and the touch sensing device 106 is electrically connected to the control circuit board 60 for switching on or turning off the heating function of the milk warmer 1, the casing 107 is screwed to the first fixing bracket 20. The heating member 30, the motor 80, the rotating member 90, the first fixing bracket 20, the control circuit board 60, the temperature measuring member 40, the second fixing bracket 101, the battery pack 103 and the touch sensing device 106 are all disposed inside the casing 107.

The casing 107 is a translucent shell, and the display device 50 is installed close to the inner side wall of the casing 107.

Figure 5:
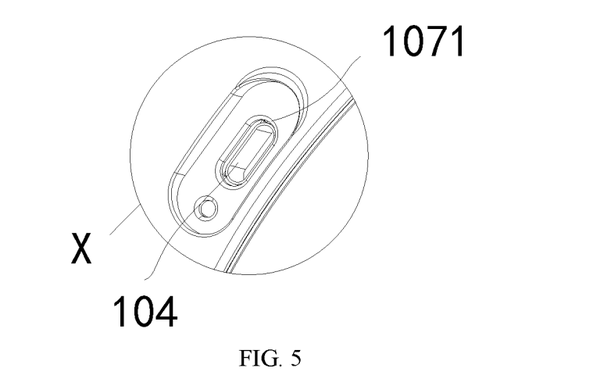
FIG. 5 is an enlarged view of part X shown in FIG. 4.

The casing 107 is provided with a connection port 1071, as shown in FIG. 5, the charging interface 104 is connected to the connection port 1071, and the waterproof member 105 is connected to the casing 107.

In some embodiments, as shown in FIG. 4, the casing 107 further includes an eighth position restraining slot 1072, and the milk warmer 1 further includes an anti-skid member 108, and the anti-skid member 108 is accommodated in the eighth position restraining slot 1072.

The anti-skid member 108 is an anti-skid pad.

Figure 12:
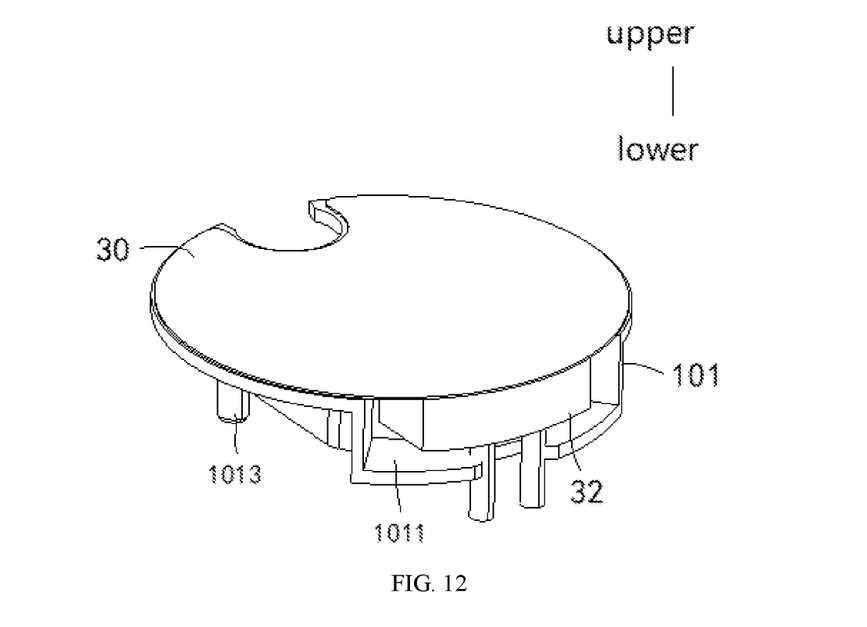
FIG. 12 is a structural schematic diagram of the heating member and the second fixing bracket according to some embodiments of the present disclosure.

In some embodiments, the heating member 30 is disposed on an upper surface of the second fixing bracket 101, as shown in FIG. 12. The heating member 30 is arranged in a circular shape.

Figure 13:
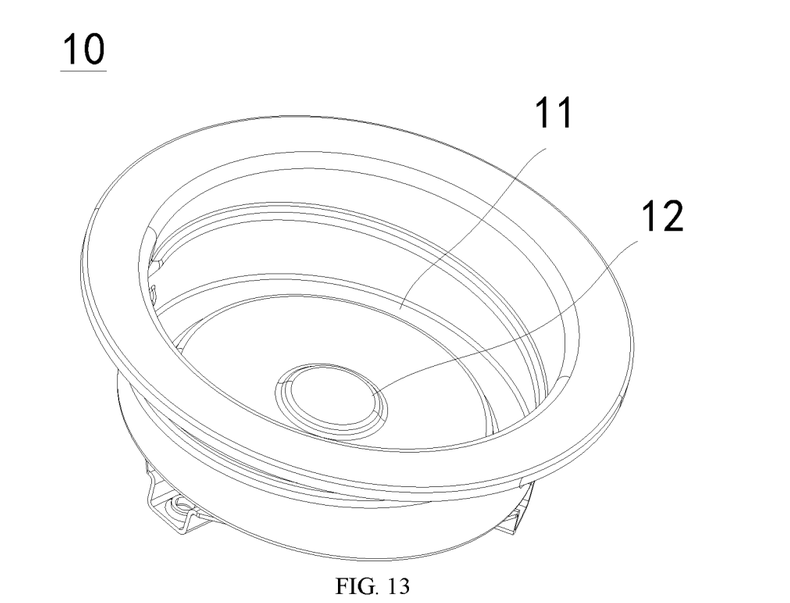
FIG. 13 is a structural schematic diagram of the milk warmer base according to some embodiments of the present disclosure.

In some embodiments, as shown in FIG. 13, the milk warmer base 10 is provided with a protruding portion 12, and the stirring member 70 is connected to the protruding portion 12.

In some embodiments, the milk warmer 1 further includes a feeding bottle or a powder storage bottle, and the milk warmer seat 10 is threadedly connected with the feeding bottle or the powder storage bottle.

In some embodiments, the control circuit board 60 is used to send a heating signal to the heating member 30, send a driving signal to the motor 80, receive temperature information sent by the temperature measuring member 40 and/or send a temperature displaying signal to the display device 50.

In some embodiments, the control circuit board 60 is integrated with an MCU (Microcontroller Unit), which is configured to control and manage overall circuit of the milk warmer 1, including manage the battery charge and discharge.

In some embodiments, the milk warmer 1 further includes an elastic member 109, the elastic member 109 is disposed in the first position restraining slot 21, and the temperature measuring member 40 passes through the central part of the elastic member 109 and is electrically connected to the control circuit board 60.

The elastic member 109 is a spring member.

In some embodiments, the motor 80 is also screwed to the first fixing bracket 20. The control circuit board 60 is further screwed to the first fixing bracket 20. The casing 107 is screwed to the first fixing bracket 20.

In other embodiments, the milk warmer 1 can cooperate with a custom developed APP (Application), thus can be connected to a mobile terminal to realize intelligent management, such as to preset a time for heating.

The milk warmer 1 can be used for warming milk, shaking milk or unfreezing milk, etc., and has multiple functions, which is better conform to the needs of modern people.

The present disclosure and its embodiments have been described above. This description is not restrictive. What are shown in the drawings are only some embodiments of the present disclosure, and the actual structure is not limited thereto. In a word, any structure, method and embodiment similar to the technical solutions or embodiments of the present disclosure, devised by any person having ordinary skill in the art who is inspired by, and without departing from the purpose of the present disclosure, without creative efforts, should belong to the scope of the present disclosure.

What is claimed is:

1. A milk warmer, comprising:
   a casing;
   a milk warmer base disposed in the casing, wherein the milk warmer base comprises a bottom and a side wall corporately forming a first accommodation space, wherein the first accommodation space is used to accommodate milk to be heated, and the side wall is provided with a screw structure for connecting a feeding bottle containing the milk;
   a heating member for heating the first accommodation space, wherein the heating member is disposed in the casing and contacts with the back side of the bottom of the milk warmer base, and the heating member comprises a connection hole;
   a temperature sensor for detecting the temperature of the heating member, wherein one end of the temperature sensor passes through the connection hole and contacts with the back side of the bottom of the milk warmer base; and
   a first fixing bracket disposed in and screwed to the casing, wherein the first fixing bracket is used to fix the position of the temperature sensor, and the other end of temperature sensor is connected with the first fixing bracket;
   wherein the first fixing bracket comprises a first position restraining slot, and the other end of the temperature sensor is accommodated in the first position restraining slot; the first fixing bracket is screwed to the milk warmer base;
   wherein the milk warmer further comprises a stirring member, a motor, a rotating member and at least one first magnetic member, wherein the stirring member is accommodated in the middle of the first accommodation space, the stirring member is magnetically connected to the rotating member through the first magnetic member, and the motor is connected to the rotating member;
   wherein the milk warmer further comprises a second fixing bracket, the second fixing bracket is connected to the first fixing bracket, the heating member is disposed on an upper surface of the second fixing bracket;
   the second fixing bracket comprises a second position restraining slot, a third position restraining slot and at least one limiting column, wherein one end of the temperature sensor passes through the third position restraining slot and is accommodated in the connection hole, the at least one limiting column is connected to the first fixing bracket;
   the heating member further comprises a connecting portion and the connecting portion is connected to the second fixing bracket, wherein the connecting portion of the heating member comprises a protrusion accommodated in the second position restraining slot; and
   the first fixing bracket is further connected with the rotating member and the motor.

2. The milk warmer according to claim 1, wherein the milk warmer further comprises a sealing member, a display, a control circuit board, a battery pack, a touch sensor, a casing, a charging interface, and a waterproof member and an anti-skid member; wherein the display, the battery pack, the touch sensor, the charging interface, the motor, the temperature sensor and the heating member are electrically connected to the control circuit board; the sealing member is accommodated in the milk warmer base; and the anti-skid member, the waterproof member and the first fixing bracket are respectively connected to the casing.

* * * * *